United States Patent [19]

Chung

[11] 3,768,045

[45] Oct. 23, 1973

[54] WIDE RANGE VARIABLE PHASE SHIFTER

[75] Inventor: Sun Ho Chung, Seoul, South Korea

[73] Assignee: Korea Institute of Science & Technology, Seoul, South Korea

[22] Filed: Oct. 5, 1971

[21] Appl. No.: 186,288

[52] U.S. Cl. .................... 333/31 R, 333/1.1, 333/10
[51] Int. Cl. .......................................... H01p 1/18
[58] Field of Search ...................... 333/1.1, 31 R, 10

[56] References Cited

UNITED STATES PATENTS

| | | | |
|---|---|---|---|
| 3,400,342 | 9/1968 | Putnam | 333/31 R |
| 3,422,378 | 1/1969 | La Rosa | 333/31 R X |
| 3,423,699 | 1/1969 | Hines | 333/31 R |

*Primary Examiner*—Paul L. Gensler
*Attorney*—Marcus B. Finnegan et al.

[57] ABSTRACT

A variable phase shifter having a substantially wide phase shift variation range is formed of more or less standard circuit elements such as inductors, capacitors, quadrature hybrids and variable capacitors (or varactor diodes), the circuit elements being connected to one another in a fashion particularly well adapted to ready fabrication.

14 Claims, 6 Drawing Figures

INVENTOR
SUN HO CHUNG

BY Finnegan, Henderson & Farabow
ATTORNEYS

WIDE RANGE VARIABLE PHASE SHIFTER

The present invention relates to variable phase shifter networks capable of functioning over an exceptionally wide phase shift range.

A variable phase shifter is a circuit which employs at least one variable component which may be a transmission line, a varactor, a variable capacitor, or a variable inductor. The phase of the signal passing through the variable phase shifter is to be varied over the phase shift range by changing values of those variable circuit elements.

One problem which has arisen in connection with circuits of previous variable phase shifters is that they are very limited in the phase shift ranges for their sizes.

It is the prime object of the present invention to devise a variable phase shifter circuit the phase shift range of which is substantially wider than previous circuitry designed for the same purpose. It is another prime object of the present invention to devise a variable phase shifter circuit which employs lumped constant circuit elements so that the size of the variable phase shifter may be very compact for their wide phase shift range.

The variable phase shifter of the present invention has other important advantages. Its lumped constant design is compatible with new hybrid integrated circuit technology thus enabling highly compact constructions. As the circuits employ lumped constant reactive components only, they will exhibit very low electrical losses, thereby being capable of handling large amounts of power for their size.

A variable phase shifter which employs reactive wave reflecting networks must have, as its circuit element, either a 3 db hybrid or a circulator. When a 3 db hybrid is used, a matched pair of reflecting networks are connected to mutually isolated ports of the hybrid and then one of the remaining ports, which are also mutually isolated, becomes an input port. Once the input port is chosen, one of the isolated ports where the matched pair of reflecting networks are connected becomes a coupled port and the other a transmitted port. The input port is DC connected to the transmitted port and the signal emerging from the transmitted port has the same phase as that of the signal incident at the input. However, the phase of the signal emerging from the coupled port advances 90° ahead of the input signal. Such phase relations are the characteristics of a 3 db hybrid and such relations are reciprocal. In other words, the relations among input, output, coupled and transmitted ports of an ideal 3 db hybrid do not depend on whichever port you choose as an input port.

To explain signal flow path in a phase shifter which employs a pair of reactive reflecting networks, let us consider an ideal 3 db hybrid, one of its four ports designated as an input port and a pair of reactive reflecting networks connected to coupled and transmitted ports. When a signal is incident at the input port, one half of the power which is transmitted to the transmitted port will be totally reflected by the reflecting network connected to it and another half of the power which is coupled to the coupled port with 90° phase shift will be totally reflected by the reflecting network connected to it. Since the reflecting networks are matched, the reflection coefficients at the ports are identical. At the input port, the phase of the signal reflected back from the coupled port is different from that of the transmitted port by 180°, thus resulting in cancellation. However the signals reflected to the output port are in phase resulting in addition.

Hence a signal incident at the input port will appear at the output port when a matched pair of totally reflecting networks are connected to the coupled port and transmitted port. Let us assume that the reflection coefficient of the signal at the reflecting networks is a complex number $\rho$. When we construct the reflecting network with reactive components only, the magnitude of the reflection coefficient is always a unity while its phase varies depending on the characteristic impedance of the ports of the hybrid and reactive during point impedance of the networks. Since the signal emerging from the output port must experience reflection from the matched pair of reflecting networks, the phase of the output signal depends on the phase of the reflection coefficient $\rho$. When the driving point reactive impedance is denoted by $X$ and the characteristic impedance of the ports of the hybrid is $Ro$, the reflection coefficient is given by the well-known equation which is $$\rho = (Ro - jX)/(Ro + jX)$$

The phase angle, $\phi$, of the reflection coefficient is $$\phi = -2 \arctan (X/Ro)$$

Let us now assume that the reactive impedance $X$ is expressible by a quotient of polynomials such that $$X = K (C-Z_1)(C-Z_2) \cdots /(C-P_1)(C-P_2) \cdots$$

where $Z_1, Z_2, \cdots$ and $P_1, P_2, \cdots$ are zeros and poles of $X$, respectively, K is a real constant, and $C$ is the capacitance of the varactor diodes in the reflecting networks.

Further, if we assume that the poles and zeros are interlaced in such a way that they satisfy inequalities $$P_1 < Z_1 < P_2 < Z_2 \cdots$$

and that there is a closed domain, $\mathbb{C}$ of $C$ such that all the poles and zeros are contained in $\mathbb{C}$, and if $C$ is the value of circuit elements in the reflecting networks and the value can be varied either electronically or manually, the magnitude of $X$ will oscillate between infinities. The phase angle, $\phi$, does not, however, become an infinity and its derivative with respect to the component value variation is finite, which is apparent from the characteristics of the inverse function arctan. The infinitely-many-valued function arctan has a period of $\pi$ and its principal value is that between $-\pi/2$ and $\pi/2$. Hence, when $C$ is allowed to vary from $P_1$ to $Z_1$, the total variation of the phase is 180°. If $C$ is forced to vary from $P_1$ to $Z_2$, a total of 540° phase shift occurs.

The idea of employing multi-pole, multi-zero totally reactive reflecting networks to achieve exceptionally wide phase variation range is the major accomplishment of this invention. It is necessary to define phase variation, or phase shift, to clearly explain the significance of this invention. By phase variation, or phase shift, we mean differential output signal phase angle changes after reset of means to control a phase shifter. When the control is the DC bias voltages of varactors, it is an electronically variable phase shifter. The changes in DC bias voltages result in phase variation of the output signal. Therefore, an exceptionally wide phase shift range phase shifter is a device whose output signal phase can be varied over the phase shift range by external controls such as bias voltages. Let us consider a phase shift of 360°. In reality the phase angle of 360° should be identical to zero phase angle. However, phase shift of 360° is different from zero phase shift. A phase shifter of 360° phase shift range must be a device the control of which is so designed that as the amount of the control applied increases, either in positively or negatively, the phase shift increases accordingly to 360°. Now consider a phase shifter where the reflecting networks have reactive impedances which become infinity when $C_v$, the capacitance of a varactor, is equal to $P_1$, zero when $C_v=Z_1$, and again infinity when $C_v=P_2$. Furthermore, assume that the inequalities $$A<P_1<Z_1<P_2<B$$

are valid and the varactor capacitance $C_v$ can be arbitrarily set to values between A and B. Then it is clearly seen that the phase shift can be larger than 360° because the output signal phase angle when $C_v=B$ is different from that when $C_v=A$ by more than 360°. As the value $C_v$ is varied from $A$ to $B$ continually, the output signal phase will change continually and, when the reference is set to the output signal phase angle when $C_v=A$, there exists unambiguous one to one correspondence between varactor capacitance and phase shift.

Hence it is clear now that an exceptionally wide phase shift range phase shifter can be realized by lumped constant circuit elements provided that the interlaced multi-pole, multi-zero reactive reflecting network with respect to values of variable lumped constant circuit elements is realizable. In this invention means for realizing such multi-pole, multi-zero reactive impedances will be shown. Referring to FIG. 6, when a circulator 20 is used, instead of a 3 db hybrid, only one such reflecting network is required. The signal incident to any one of the three ports of a circulator is transmitted to the next port where a reflecting network is connected and reflects the signal to the next port with a reflection coefficient the magnitude of which is unity. The principle involved with variation of the phase of a signal over the desired phase shift range is the same.

To the accomplishment of the above, and to such other objects as may hereinafter appear, the present invention relates to reflecting network arrangements in a variable phase shifter as defined in the appended claims and as described in this specification, taken together with the accompanying drawings, in which FIG. 1 is a circuit diagram of the phase shifter which employs a 3 db hybrid and a pair of matched reflecting networks which realize single pole single zero reactive impedance with respect to the capacitance of the varactor;

Figure 1:
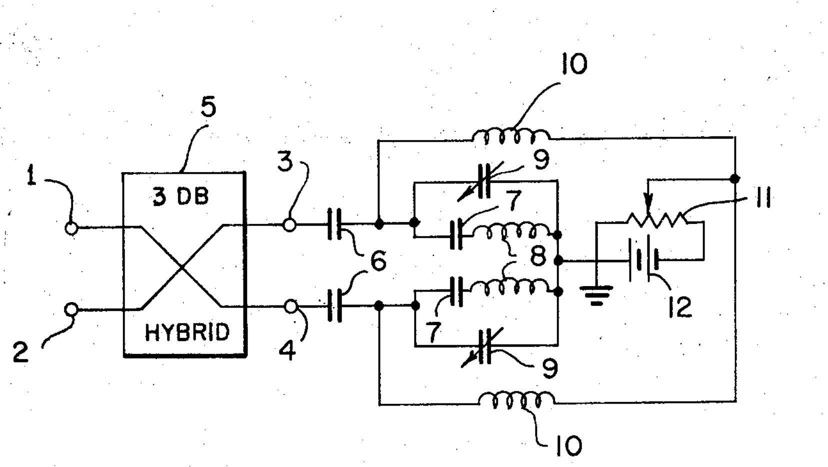

In the circuit disclosed in FIG. 1, the ports 1 and 2 constitute input and output ports, respectively, and the ports 3 and 4 are respectively transmitted and coupled ports. Capacitors 6 block DC currents from flowing into the 3 db hybrid 5. Series type circuits 7 and 8 are respectively capacitors and inductors whose values are so chosen that when the capacitance of a varactor 9 becomes equal to $C_r/(\omega^2C_rL_r - 1)$, where $C_r$ and $L_r$ are respectively capacitance and inductance of 7 and 8, the reactive impedance becomes infinity. The capacitance, $C_b$, of the DC block 6 must be smaller than $[C_r/(\omega^2C_rL_r-1)]-C_b$ in order to have a zero at $[C_r/(\omega^2C_rL_r-1)]-C_b$. Therefore, if we choose a varactor diode the capacitance of which can be varied from a value smaller than $[C_r/(\omega^2 C_rL_r-1(]-C_b$ to a value larger than $C_r/(\omega^2 C_rL_r-1)$, the phase shifter network will have phase variation greater than 180°. Here $\omega$ denotes the angular frequency of the signal and deciding values of $C_r$, $L_r$ and $C_b$ depends on $\omega$ as well as capacitance of varactors. When a 3 db hybrid is used every element in the reflecting network should be matched to the corresponding one in the other reflecting network. This applies to varactor characteristics also. To apply DC bias voltage to varactor diodes, a control circuit is added. The DC voltage of a battery 12 is supplied to varactors through potentiometer 11 and RF choke 10. The inductance of the RF choke 10 must be large enough to keep RF signals from grounding through DC voltage source.

Figure 2:
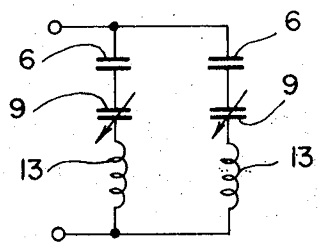
FIG. 2 is a circuit diagram of a reflecting network which realizes single pole double zero reactive impedance with respect to the capacitance of the varactor.
Figure 5:
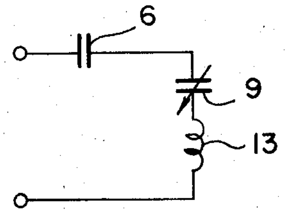
FIG. 5 is a circuit diagram of a series type network which realizes a zero with respect to the capacitance of the varactor in reactive termination.
Figure 6:
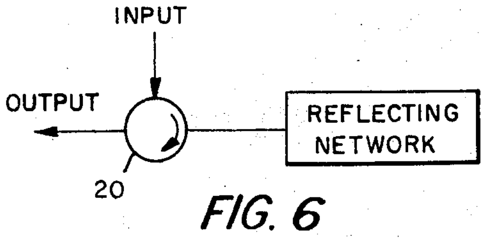
FIG. 6 is a circuit diagram of a phase shifter which employs a circulator and a single reflecting network.

In FIG. 2, a parallel connection of two series type reactive circuits is shown. Each branch has the same circuit configuration as the one in FIG. 5. The reactive impedance of the circuit in FIG. 5 can be easily computed to obtain $$[C_v-(C_b/\omega^2C_bL-1)]/[C_vC_b\ \omega/\omega^2C_bL-1]$$

where $C_v$, $C_b$ and $L$ are respectively the capacitance of varactor diode 9, the capacitance of DC blocking capacitors and the inductance of resonating inductor 13. From the above impedance function, it is observed that the circuit in FIG. 5 has a zero at $$C_v = C_b/\omega\ ^2C_bL-1$$

and a pole at $C_v=0$. However the pole at $C_v=0$ is not realizable because the capacitance of a varactor diode cannot be reduced to zero.

Figure 4:
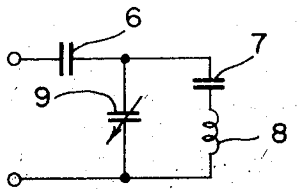
FIG. 4 is a circuit diagram of a parallel type network which realizes a pole with respect to the capacitance of the varactor.
Figure 3:
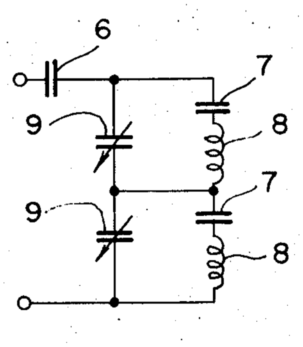
FIG. 3 is a circuit diagram of a reflecting network which realizes double pole double zero reactive impedance with respect to the capacitance of the varactor.

The circuit which is described in FIG. 4 is used in the phase shifter of FIG. 1. The fact that this type of circuit has a single zero impedance has been already mentioned and the series connection of two of this type of circuits, as shown in FIG. 3, results in double pole, double zero reactive impedance. The equations for the reactive impedance of the circuits described in FIG. 2 and FIG. 3 can be derived rather easily but are not written here because of their long and complex forms. In actual design, the values of circuit components must be chosen in such a way that the performance of the phase shifter is optimized. Techniques for optimizing circuit components are readily available from prior art literature, and it will be understood by persons skilled in the art that many circuit configurations other than the examples shown in the drawing can be used to achieve the interlaced pole-zero reactive impedance characteristic of the reflecting networks. However, the present invention includes the method of realizing interlaced pole-zero reactive impedance function with respect to varactor capacitance by using the series resonating circuit and the parallel resonating circuit as its building blocks for the reflecting networks.

What is claimed is:

1. A variable phase shifter, comprising:

a 3 db hybrid circuit having an input port for receiving an input signal, a transmitted port for producing a signal in phase with the input signal, a coupled port for producing a signal 90° ahead of the input signal, and an output port;

first and second matched reactive reflecting networks connected to said transmitted and coupled ports, respectively, of said hybrid circuit, each of said reflecting networks comprising a resonant circuit including a voltage variable impedance element and a plurality of elements of fixed impedance, said elements having impedance values selected to provide a reactive impedance characteristic for each reflecting network varying in a domain in which its poles and zeros are interlaced as the impedance of each variable impedance element is varied; and means for varying the impedance of both variable impedance elements to obtain a phase shift signal at said output port of said hybrid circuit in response to the input signal.

2. The variable phase shifter of claim 1, wherein:

each of said reflecting networks includes first and second series resonated reactive circuits connected in parallel; and said element of variable impedance comprises first and second varactor diodes in said first and second series resonated reactive circuits, respectively, said varactor diodes having variable capacitances determined by reverse bias voltages applied to said varactor diodes.

3. The variable phase shifter of claim 1, wherein:

each of said reflecting networks includes first and second resonant circuits connected in series; and said element of variable impedance comprises first and second varactor diodes connected in parallel with said first and second resonant circuits, respectively, said varactor diodes having variable capacitances determined by reverse bias voltages applied to said varactor diodes.

4. The variable phase shifter of claim 3, wherein:

each reflecting network includes a blocking capacitor connected in series with said first and second resonant circuits.

5. The variable phase shifter of claim 1, wherein:

each of said reflecting networks includes a resonant circuit comprising a capacitor and inductor connected in series; and said element of variable impedance comprises a varactor diode in each reflecting network connected in parallel with the resonant circuit, said varactor diode having a variable capacitance determined by a reverse bias voltage applied to said varactor diode.

6. The variable phase shifter of claim 5, which includes:

a pair of blocking capacitors for coupling the resonant circuits of said first and second reflecting networks to said transmitted and coupled ports of said hybrid circuit.

7. The variable phase shifter of claim 5, wherein said impedance varying means comprises:

a control circuit for applying a variable reverse bias voltage to both varactor diodes to vary the capacitances of said diodes.

8. The variable phase shifter of claim 7, wherein said control circuit comprises:

a potentiometer for producing a variable voltage output; and an RF choke for each varactor diode responsive to the output of said potentiometer for applying the variable voltage output to each varactor diode as a reverse bias voltage.

9. A variable phase shifter comprising:

a circulator having an input port for receiving an input signal, an intermediate port to which the input signal is transferred, and an output port;

a reactive reflecting network connected to said intermediate port of said circulator, said reflecting network comprising a resonant circuit including a voltage variable impedance element and a plurality of elements of fixed impedance, said elements having impedance values selected to provide a reactive impedance characteristic for said reflecting network varying in a domain in which its poles and zeros are interlaced as the impedance of said variable impedance element is varied; and means for varying the impedance of said variable impedance element to obtain a phase shift signal at said output port of said circulator in response to the input signal.

10. The variable phase shifter of claim 9, wherein:

said reflecting network includes first and second series resonated reactive circuits connected in parallel; and said element of variable impedance comprises first and second varactor diodes in said first and second series resonated reactive circuits, respectively, said varactor diodes having variable capacitances determined by reverse bias voltages applied to said varactor diodes.

11. The variable phase shifter of claim 9, wherein:

said reflecting network includes a resonant circuit comprising a capacitor and inductor connected in series; and said element of variable impedance comprises a varactor diode connected in parallel with said resonant circuit, said varactor diode having a variable capacitance determined by a reverse bias voltage applied to said varactor diode.

12. The variable phase shifter of claim 11, which includes:

a blocking capacitor for coupling said resonant circuit to the intermediate port of said circulator.

13. The variable phase shifter of claim 9, wherein:

said reflecting network includes first and second resonant circuits connected in series; and said element of variable impedance comprises first and second varactor diodes connected in parallel with first and second resonant circuits, respectively, said varactor diodes having variable capacitances determined by reverse bias voltages applied to said varactor diodes.

14. The variable phase shifter of claim 13, wherein:

said reflecting network includes a blocking capacitor connected in series with said first and second resonant circuits.

* * * * *